United States Patent
Tzadok

(10) Patent No.: US 11,555,908 B2
(45) Date of Patent: Jan. 17, 2023

(54) MULTI RANGE RADAR SYSTEM

(71) Applicant: International Business Machines Corporation, Armonk, NY (US)

(72) Inventor: Asaf Tzadok, New Castle, NY (US)

(73) Assignee: International Business Machines Corporation, Armonk, NY (US)

( * ) Notice: Subject to any disclaimer, the term of this patent is extended or adjusted under 35 U.S.C. 154(b) by 308 days.

(21) Appl. No.: 16/562,564

(22) Filed: Sep. 6, 2019

(65) Prior Publication Data

US 2021/0072368 A1     Mar. 11, 2021

(51) Int. Cl.
*G01S 13/34*          (2006.01)

(52) U.S. Cl.
CPC .......... *G01S 13/347* (2013.01); *G01S 13/343* (2013.01)

(58) Field of Classification Search
CPC .... G01S 13/341; G01S 13/342; G01S 13/343; G01S 13/345; G01S 13/347; G01S 13/36; G01S 13/38; G01S 13/40; G01S 13/34; G01S 13/356; G01S 13/4056; G01S 13/282
USPC .......................... 342/128, 196, 129, 200, 134
See application file for complete search history.

(56) References Cited

U.S. PATENT DOCUMENTS

| | | | | |
|---|---|---|---|---|
| 3,310,802 A * | 3/1967 | Coleman | ................. | G01S 13/78 342/44 |
| 5,499,029 A * | 3/1996 | Bashforth | ............. | G01S 13/286 342/194 |
| 5,546,085 A * | 8/1996 | Garnaat | ................... | G01S 7/023 342/25 A |
| 6,864,826 B1 * | 3/2005 | Stove | ..................... | G01N 22/00 342/134 |
| 7,094,204 B2 * | 8/2006 | Banjanin | ............. | G01S 7/52047 600/443 |
| 7,095,362 B2 * | 8/2006 | Hoetzel | ................. | G01S 13/931 342/84 |
| 7,148,840 B2 * | 12/2006 | Dooi | ....................... | G01S 13/08 342/131 |

(Continued)

OTHER PUBLICATIONS

Pauli, Mario, et al., "Miniaturized Millimeter-Wave Radar Sensor for High-Accuracy Applications", IEEE Transactions on Microwave Theory and Techniques, vol. 65, No. 5, May 2017, pp. 1707-1715.

(Continued)

*Primary Examiner* — Erin F Heard
*Assistant Examiner* — Michael W Justice
(74) *Attorney, Agent, or Firm* — Harrington & Smith

(57) ABSTRACT

A method includes generating a first modulated continuous wave from a generating location; transmitting the first modulated continuous wave to an object positioned at a distance from the generating location; generating a second modulated continuous wave from the generating location, wherein the second modulated continuous wave is generated at a predetermined time that is different from a predetermined time at which the first modulated continuous wave is generated; receiving, at a mixer, the first modulated continuous wave from the object; receiving, at the mixer, the second modulated continuous wave from the generating location; mixing the received first modulated continuous wave with the second modulated continuous wave to produce a beat signal to determine a range of the object from the generating location; and outputting the determined range of the object from the generating location.

14 Claims, 13 Drawing Sheets

(56) References Cited

U.S. PATENT DOCUMENTS

| | | | | |
|---|---|---|---|---|
| 7,629,919 | B2* | 12/2009 | Wilcox | G01S 13/767 342/135 |
| 7,737,879 | B2 | 6/2010 | Tietjen et al. | |
| 7,808,424 | B2* | 10/2010 | Wilcox | G01S 13/825 342/135 |
| 8,077,076 | B2* | 12/2011 | Walter | G01S 13/345 342/128 |
| 8,259,006 | B2 | 9/2012 | Culkin | |
| 9,921,296 | B2* | 3/2018 | Greenberg | G01S 13/34 |
| 10,101,438 | B2* | 10/2018 | Subburaj | G01S 7/023 |
| 10,680,863 | B2* | 6/2020 | Spalink | G01S 13/583 |
| 10,809,353 | B2* | 10/2020 | Subburaj | G01S 7/354 |
| 2004/0039283 | A1* | 2/2004 | Banjanin | G01S 7/52047 600/437 |
| 2005/0225476 | A1* | 10/2005 | Hoetzel | G01S 13/24 342/135 |
| 2006/0012511 | A1* | 1/2006 | Dooi | G01S 13/87 342/111 |
| 2006/0044181 | A1* | 3/2006 | Wilcox | G01S 13/825 342/194 |
| 2009/0189800 | A1* | 7/2009 | Benari | G01S 7/4052 342/134 |
| 2009/0315761 | A1* | 12/2009 | Walter | G01S 13/931 342/200 |
| 2010/0026557 | A1* | 2/2010 | Wilcox | G01S 13/767 342/118 |
| 2011/0037642 | A1* | 2/2011 | Stove | G01S 7/35 342/128 |
| 2014/0049423 | A1* | 2/2014 | De Jong | G01S 13/536 342/25 A |
| 2014/0184437 | A1* | 7/2014 | Takabayashi | G01S 7/352 342/107 |
| 2015/0192665 | A1* | 7/2015 | Lim | G01S 7/0234 342/59 |
| 2015/0378010 | A1* | 12/2015 | Greenberg | G01S 13/282 342/173 |
| 2016/0294590 | A1* | 10/2016 | Spalink | G01S 13/583 |
| 2017/0336506 | A1 | 11/2017 | Corcos et al. | |
| 2020/0191935 | A1* | 6/2020 | Mende | G01S 13/347 |

OTHER PUBLICATIONS

Melzer, Alexander, et al., "Short-Range Leakage Cancelation in FMCW Radar Transceivers Using an Artificial On-Chip Target", IEEE Journal of Selected Topics in Signal Processing, vol. 9, No. 8, Dec. 2015, pp. 1650-1660.

Lim, Hyeokjin, et al., "A Short Range FMCW Radar System with Low Computational Complexity", International Journal of Electronics and Electrical Engineering, vol. 4, No. 4, Aug. 2016, pp. 370-373.

* cited by examiner

MULTI RANGE RADAR SYSTEM

BACKGROUND

The exemplary embodiments described herein relate generally to radar systems and, more specifically, to a radar system capable of detecting an object at different ranges.

A state of the art radar system generally uses a Frequency Modulated Continuous Wave (FMCW) generator. In such a system, a waveform is transmitted, and a received signal is mixed with the transmitted signal. The system analyzes the frequency spectrum, with each peak of the spectrum representing a frequency difference (F-beat) and therefore the distance of the object from the transceiver. This system and its associated methods find use in mid- and long-range radar applications where the distance is substantial and therefore the frequency of the received signal is clear and accurate. In such a system, range resolution is defined by the bandwidth used, which also defines the minimum detectability of an object.

Radar systems have been developed for autonomous driving and for other applications in which radar is used at short range. Various approaches to improve radar performance for short-range applications include the use of wider bandwidth, sometimes as wide as 7 gigahertz (GHz), with faster sweep time at high frequency (for example, in the 122 GHz range). Some use digital waveform, such as a Pseudo Random Binary Sequence (PRBS), and super-fast digital pipeline using multi-channel state-of-art Analog to Digital Converters (ADCs). Drawbacks of such approaches, however, are that wider bandwidths and faster sweep times limit the number of devices that can be used simultaneously due to the need for extra computation, power consumption, and the use of state-of-art hardware.

Mid- and long range radar systems pose additional challenges, as the F-beat is high and therefore requires more computation. In such systems, this is mitigated by the use of a long waveform, which reduces the frequency and computation requirements. However, this results in slower than possible radar readings.

BRIEF SUMMARY

In accordance with one aspect, a method comprises generating a first modulated continuous wave from a generating location; transmitting the first modulated continuous wave to an object positioned at a distance from the generating location; generating a second modulated continuous wave from the generating location, wherein the second modulated continuous wave is generated at a predetermined time different from a predetermined time at which the first modulated continuous wave is generated; receiving, at a mixer, the first modulated continuous wave from the object; receiving, at the mixer, the second modulated continuous wave from the generating location; mixing the received first modulated continuous wave with the second modulated continuous wave to produce a beat signal to determine a range of the object from the generating location; and outputting the determined range of the object from the generating location. The predetermined time at which the second modulated continuous wave is generated may be before or after the predetermined time at which the first modulated continuous wave is generated.

In accordance with another aspect, a computer system comprises one or more memories having computer readable code; one or more processors, where the one or more processors, in response to retrieving and executing the computer readable code, cause the computer system to perform the following: mixing a received first modulated continuous wave with a second modulated continuous wave to produce a beat signal to determine a range of an object from a generating location; and outputting the determined range of the object from the generating location.

In accordance with another aspect, a computer program product comprises a computer readable storage medium having program instructions embodied therewith, the program instructions executable by a computer system to cause the computer system to perform operations comprising: mixing a received first modulated continuous wave with a second modulated continuous wave to produce a beat signal to determine a range of the object from a generating location; and outputting the range of the object from the generating location.

BRIEF DESCRIPTION OF THE SEVERAL VIEWS OF THE DRAWINGS

The foregoing and other aspects of exemplary embodiments are made more evident in the following Detailed Description, when read in conjunction with the attached Drawing Figures, wherein.

DETAILED DESCRIPTION

The word "exemplary" is used herein to mean "serving as an example, instance, or illustration." Any embodiment described herein as "exemplary" is not necessarily to be construed as preferred or advantageous over other embodiments. All of the embodiments described in this Detailed Description are exemplary embodiments provided to enable persons skilled in the art to make or use the invention and not to limit the scope of the invention which is defined by the claims.

The systems and methods described herein may be used in conjunction with radar systems that are capable of detecting objects at different ranges. One main idea thereof is to artificially increase a distance between the object being detected and the radar system. Based on this, a sufficient frequency resolution may be obtained for short-range detection of the object or even for optimization of the radar for a specific range. Also, the distance between the object being detected and the radar system may be artificially decreased to detect the object at long range (or for optimization for a range). This has a clear advantage over current methods in that high accuracy is maintained while the requirement for wider bandwidths and/or faster sweep times is reduced.

Figure 1A:
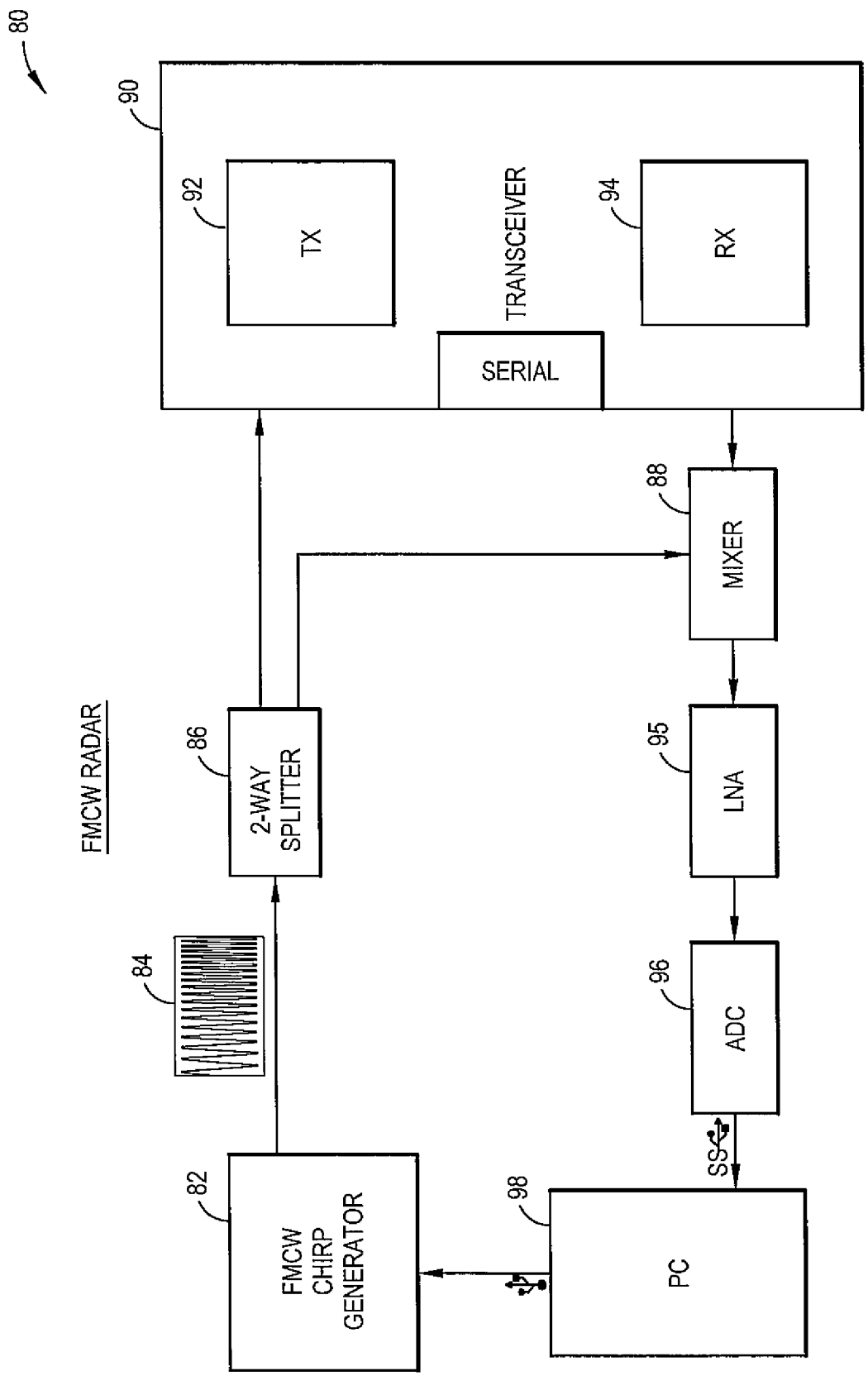
FIGS. 1A and 1B are schematic representations of a single target radar system.

Referring to FIG. 1A, a frequency modulated continuous wave (FMCW) radar system for detecting a target at close range is shown generally at 80 and is hereinafter referred to as "FMCW system 80." Similar principles apply for detecting objects at long range. In detecting closer objects at short ranges, the FMCW system 80 uses a chirp generator 82 that provides a frequency modulated continuous wave 84 to a two way splitter 86, with a first output from the splitter 86 connected to a mixer 88 and a second output from the splitter 86 connected to a transceiver 90. A portion of the signal sent to the transceiver 90 is sent to a transmitter (TX) 92, which hits a target and receives the reflections at a receiver 94, which then mixes the received signals in the mixer 88. A result is a combined signal from many reflections with different frequencies and amplitudes, which is processed through a low noise amplifier 95 and an analog-to-digital converter 96 and is received into a processor 98. In the processor 98, this result can be separated using FFT (Fast Fourier Transform).

Figure 1B:
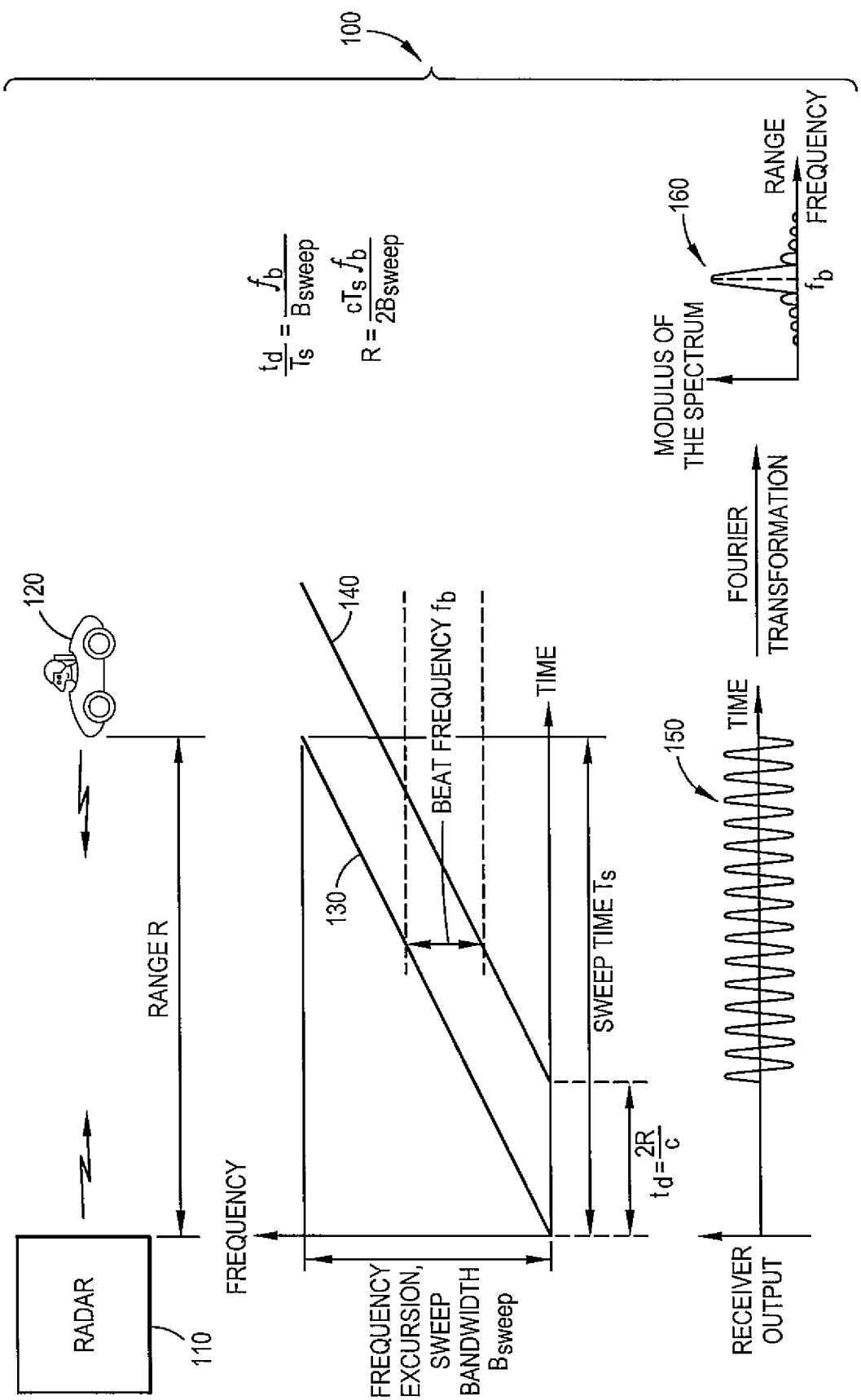

Referring to FIG. 1B, a single target radar system based on the FMCW system 80 is shown generally at 100 and is hereinafter referred to as "system 100." In system 100, a radar device 110 is used to determine a distance or range R of an object 120. To determine the range R, frequency excursion is measured as a function of sweep time. A first measurement 130 of frequency at a first time is plotted. A second measurement 140 of frequency at a second time is then plotted. A difference in frequency between the first measurement 130 and the second measurement 140 at a particular time t gives a beat frequency $f_b$. A signal output 150 corresponding to the beat frequency $f_b$ is then subjected to Fourier transformation, and a peak 160 at the beat frequency $f_b$ is used to determine the range R.

Figure 2:
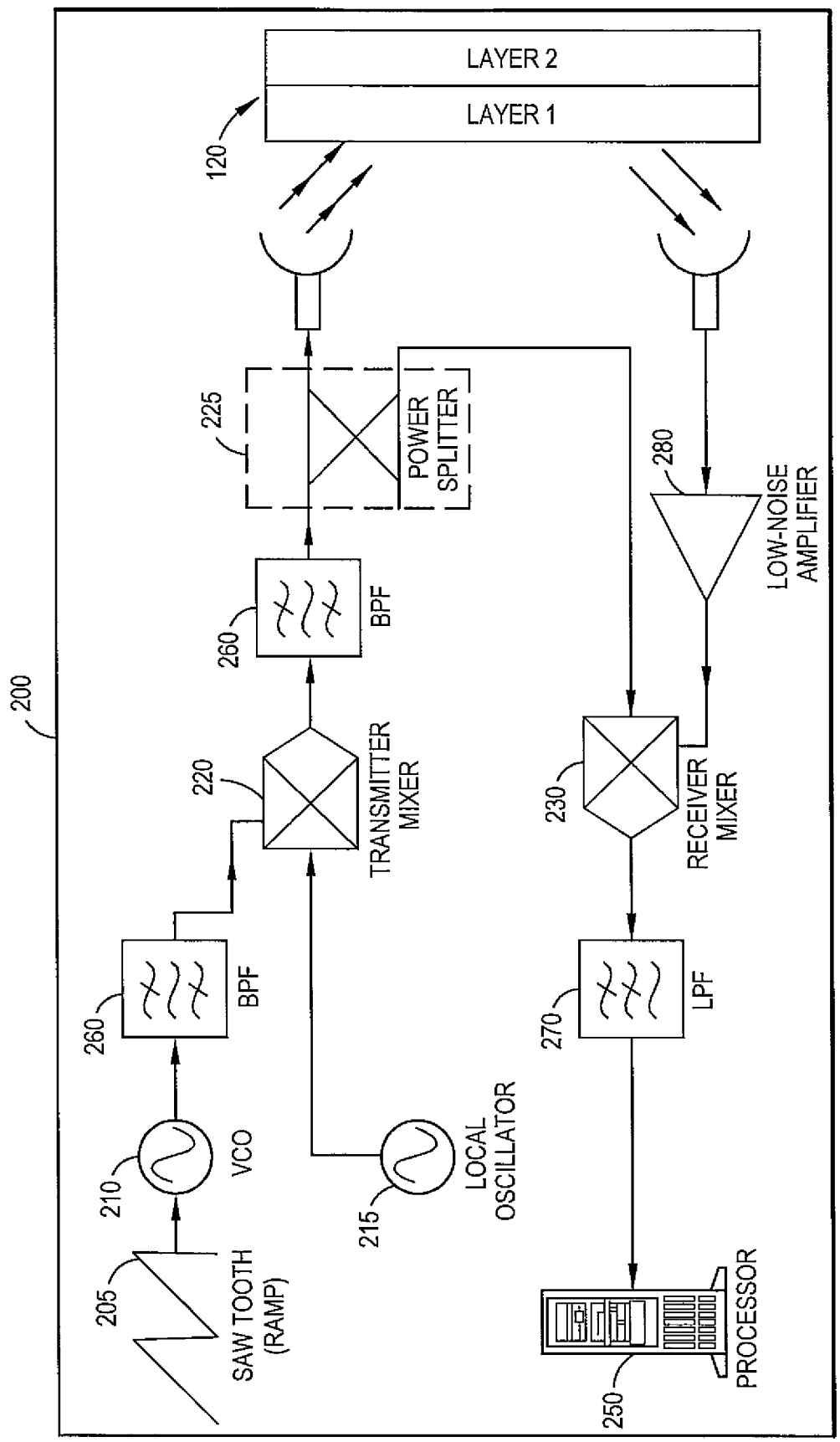
FIG. 2 is a schematic diagram of a circuit of the single target radar system of FIG. 1.

Referring to FIG. 2, a schematic circuit diagram of the system 100 is shown generally at 200 and is hereinafter referred to as "circuit 200." Circuit 200 receives a sawtooth input signal 205 into a VCO 210, which is mixed with a signal from a local oscillator 215 in a transmitter mixer 220, and which is used to sense the object 120. A portion of the signal is split in a power splitter 225 and is returned to a receiver mixer 230. The signal from the receiver mixer 230 is then processed in a processor 250. The signal(s) are filtered at various stages using band pass filters 260 and low pass filters 270. The received signal from the sensed object 120 may also be passed through a low-noise amplifier 280 before being received into the receiver mixer 230.

Figure 3:
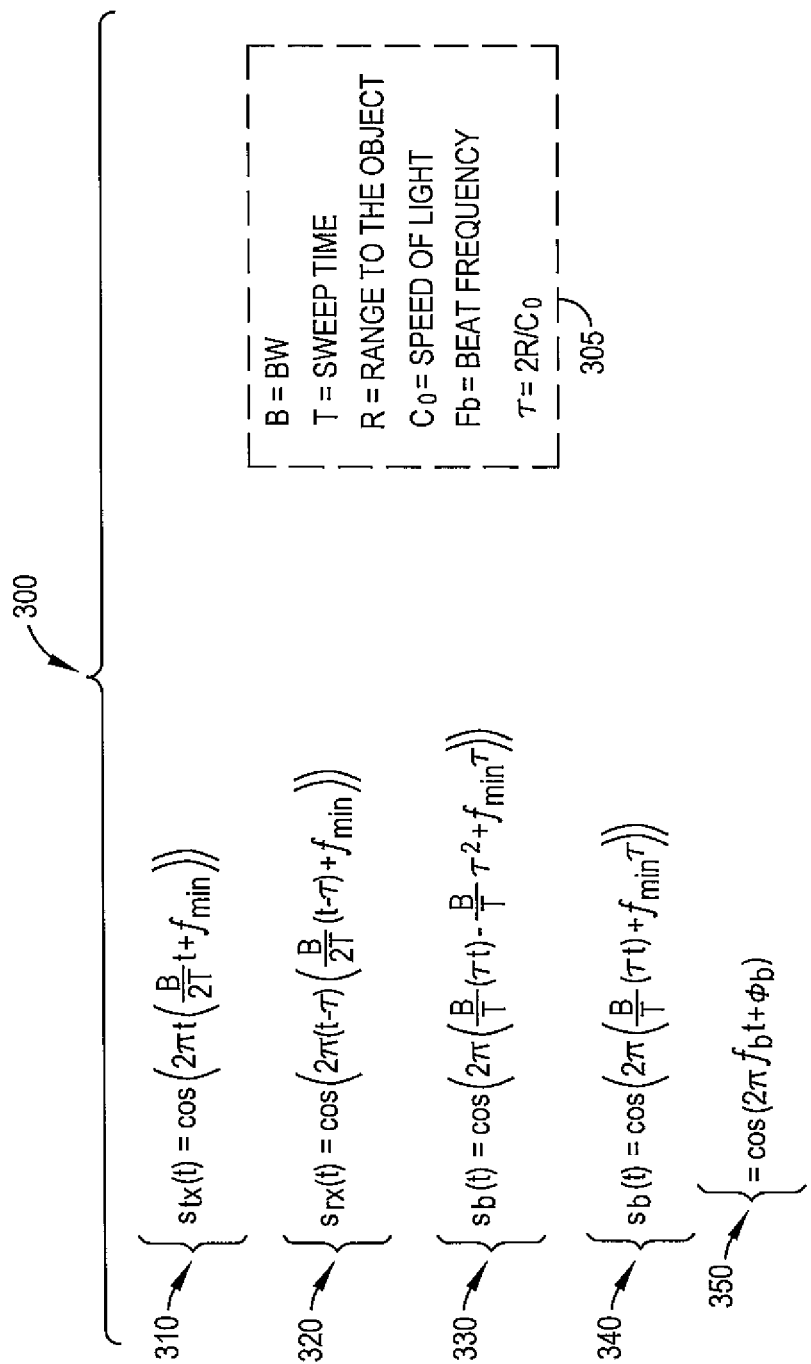
FIG. 3 is a graphic illustrating various equations used to process signals for FMCW-based radar systems.

Referring to FIG. 3, various equations used to process signals for an FMCW generator of a short range radar system are shown generally at 300. Variables are indicated in a legend at 305. The signal processing portion of the FMCW generator utilizes a coarse range estimation based on frequency evaluation. The generator transmits a frequency modulated signal as shown by equation 310. The received signal, which is reflected by the target, is shown by equation 320. The received signal is detected by the radar after the delay time. The transmitted signal and the received signal (equations 310, 320) are mixed together in order to produce the beat frequency $f_b$. Using an ideal mixer results in a multiplication of the received signal (equation 320) and the transmitted signal (equation 310). After the removal of unwanted components of the mixing process (such as portions of the multiplied signals) by a dedicated low pass filter, the resulting beat signal is shown by equation 330. Since the application of highly accurate measurements is limited to measurement distances of only a few meters, the delay time of the radar signal is in the range of nanoseconds, and the sweep time is in the range of milliseconds. Thus, the $(B/2T)\tau^2$ term in equation 330 can be neglected, thereby resulting in the simplified expression of equation 340, which simplifies to the equation 350 in which $\phi_b$ is the phase of the beat signal.

Figure 4A:
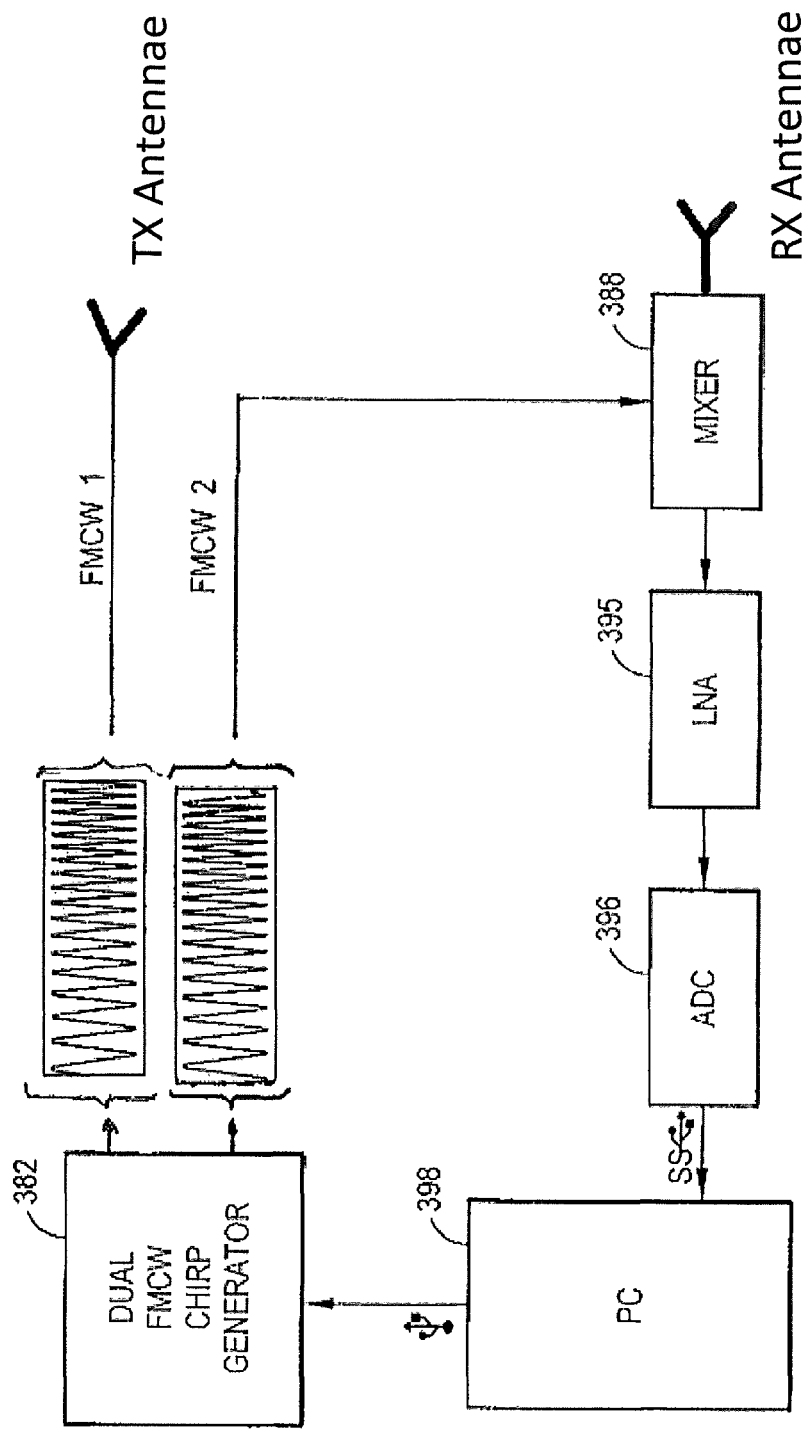
FIGS. 4A through 4C are schematic representations of exemplary embodiments of arrangements of components of short range radar systems.

Referring to FIG. 4A, one exemplary embodiment of a dual FMCW radar system is shown generally at 380 and is hereinafter referred to as "dual FMCW system 380." Dual FMCW system 380 uses a dual FMCW chirp generator 382 that is configured for a given bandwidth of an FMCW chirp. The dual FMCW chirp generator 382 provides two identical streams (FMCW1 and FMCW2), but the one that is connected directly to a mixer 388 (FMCW2) starts ahead of the one that is connected to a antenna 390 to mimic a shift in space. The mixer 388 and a low noise amplifier 395 are analog components, whereas the other components (the ADC 396 and the processor 398) are digital.

As an alternative to starting the FMCW2 ahead of the FMCW1, both signals can be started at the same time, with one being started on a higher frequency than the other. This can be implemented, for example, by employing a digital-to-analog converter with two analog outputs, where the output starts earlier. This may also be implemented, for example, by configuring two identical direct digital synthesizers (DDS) with a shift in start frequency but with the same slope, or alternatively with an identical configuration but with a delay in the trigger. This may still further be implemented, for example, by configuring two identical voltage controlled oscillators (VCO) with a delayed ramp by delta T or using a small change in input voltages.

In an adaptive configuration, the delta T can be automatically configured based on the bandwidth being used, the system range, and the speed of the ADC. A conventional formula for range resolution would be C/(2*BW), where C is the speed of light and BW is the bandwidth allocated for the radar. For example, if the BW is 100 MHz, the range resolution is about 5 feet (about 150 centimeters (cm)). In this case, if the object is 75 cm away, it will not be recognized. However, a shift of only 2.5 nanoseconds (ns) between the FMCW1 and FMCW2 will allow detection of this object as if it were located 5 feet away.

Figure 4B:
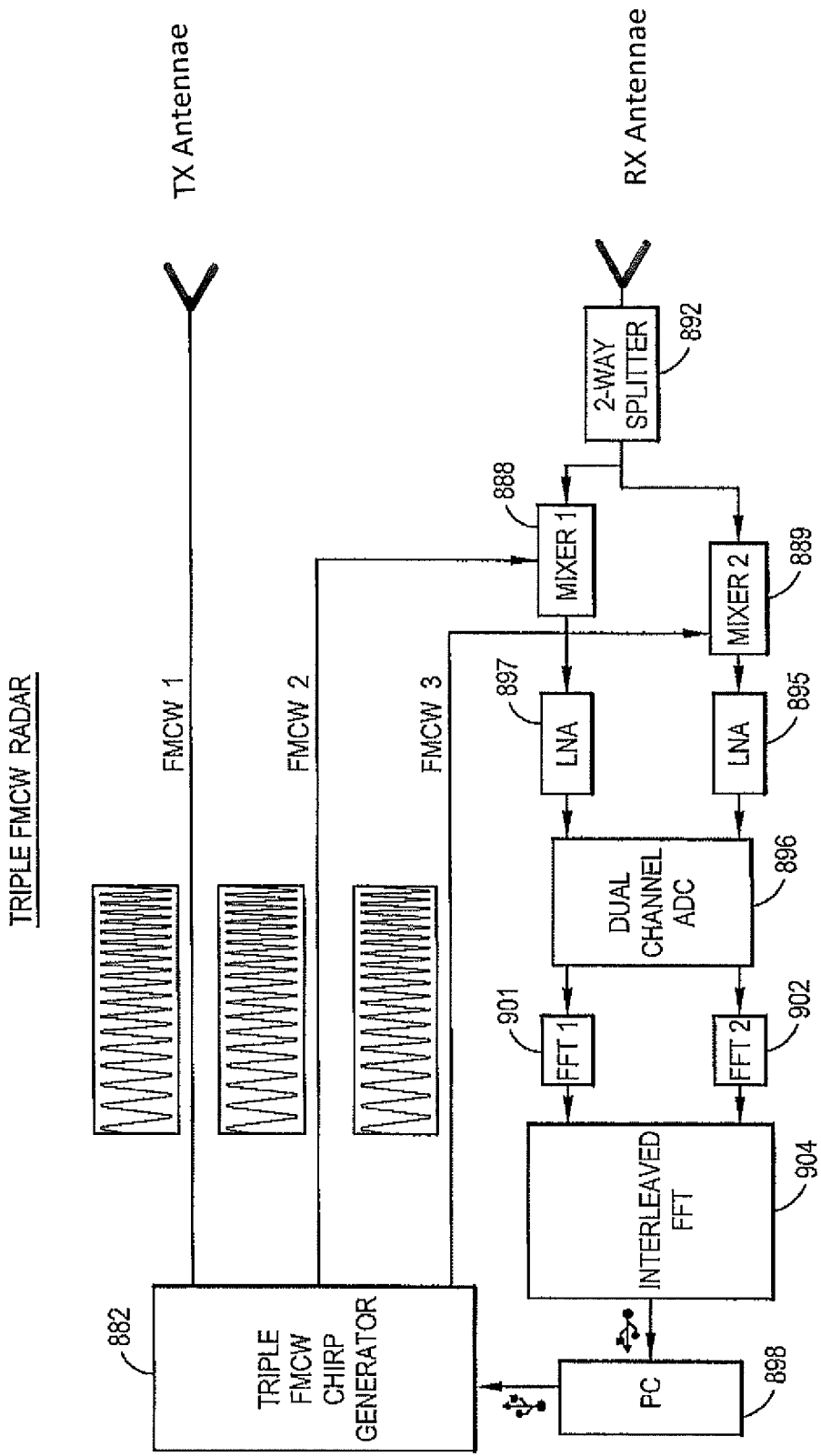

Referring to FIG. 4B, one exemplary embodiment of a triple FMCW radar system is shown generally at 880 and is hereinafter referred to as "triple FMCW system 880." Triple FMCW system 880 is similar to the dual FMCW system 380, but triple FMCW system 880 uses a triple FMCW chirp generator 882 that is configured for a given bandwidth of an FMCW chirp. The triple FMCW chirp generator 882 provides three identical streams (FMCW1, FMCW2, and FMCW3), with FMCW2 connected directly to a first mixer 888 that starts ahead of FMCW1 connected to a transceiver 890 to mimic a shift in space. FMCW3 is shifted half of a range resolution relative to FMCW2 to improve performance and is connected directly to a second mixer 889. A received signal from the transceiver 890 is fed to a splitter 892, with a first portion going to the first mixer 888 and a second portion going to the second mixer 889. Respective portions from the first mixer 888 and the second mixer 889 are sent to LNA 895 and LNA 897 with outputs being sent to a dual channel ADC 896. From the dual channel ADC 896, Fast Fourier Transform (FFT) is applied in frequency bins 901, 902, the outputs of which are fed to an FFT interleaver 904. The interleaved version of the two FFT signals uses twice the number of frequency bins to obtain double the resolution. The interleaved signal from the interleaver 904 is subsequently fed to a processor 898.

Figure 4C:
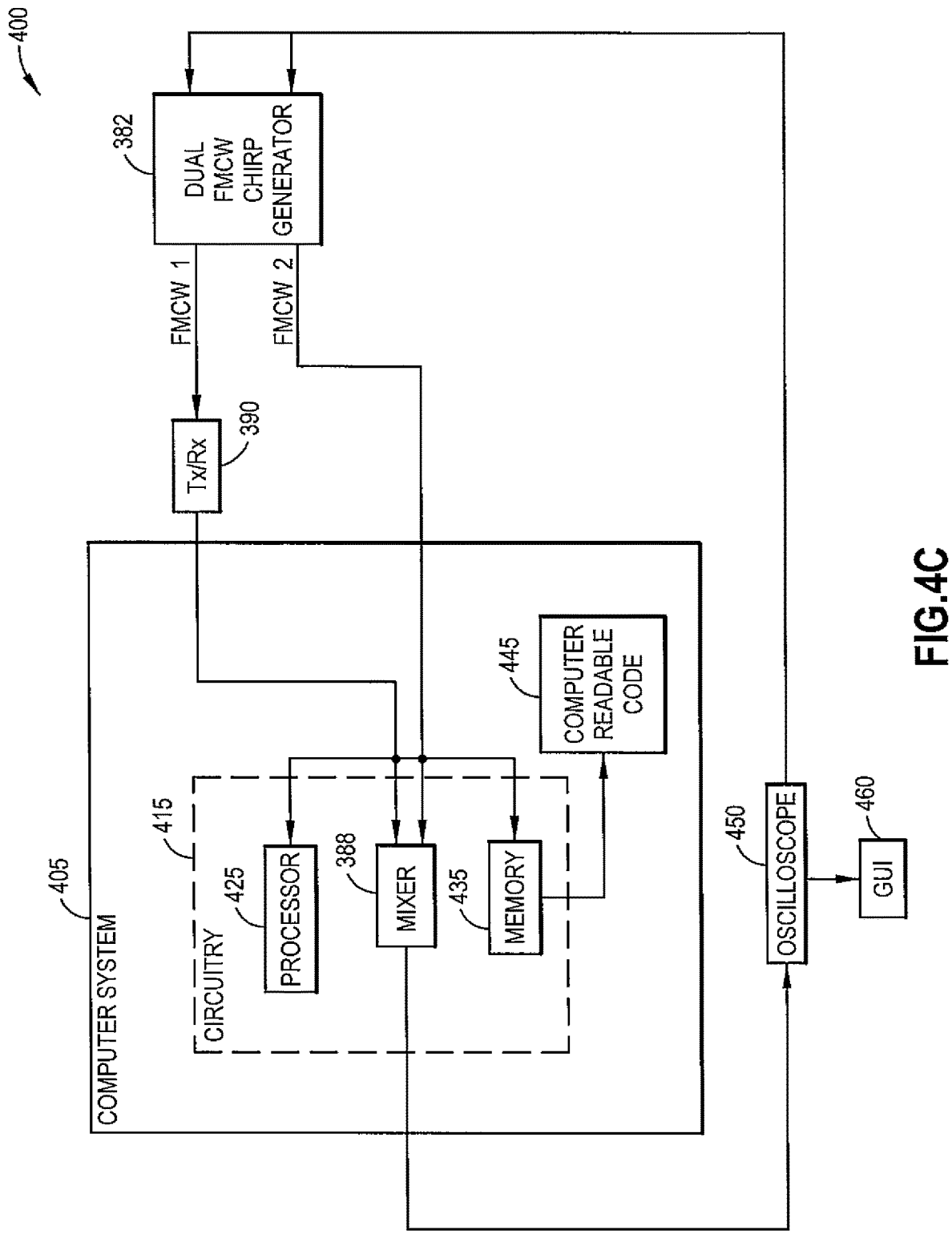

Referring to FIG. 4C, one exemplary embodiment of an arrangement of components of a short range radar system using the dual FMCW system 380 (although the triple FMCW system 880 may be used), in which a distance between an object being detected and the radar system is artificially increased, is shown generally at 400 and is hereinafter referred to as "system 400." System 400 uses the dual FMCW chirp generator 382 to generate the FMCW1 and FMCW2, the antenna 390, an oscilloscope 450, and a graphical user interface 460 (GUI 460), all of which may be used in in conjunction with a computer system 405. The computer system 405 includes circuitry 415, which includes a processor 425, the mixer 388 to carry out a mixing process, and memory 435. The memory 435 includes or is in communication with computer readable code 445.

The dual FMCW chirp generator 382 may comprise a 15 GHz wideband low noise PLL having an integrated VCO. The input signal to each generator is a 100 megahertz (MHz) on board oscillator that is serially connected to a reference board.

The output FMCW1 is directed to the antenna 390, which transmits in the millimeter range and operates in the spectrum between 24 GHz and 300 GHz to provide sub-millimeter range accuracy.

The output FMCW2 is similar to the FMCW1 but is connected to the mixer 388. Each of the FMCW1 and FMCW2 are processed in the mixer 388 to determine a corresponding beat signal according to equation 330 above. The mixer 388 receives coaxial connections from the antenna 390 and the dual FMCW chirp generator 382 at frequencies of about 100 MHz to about 1100 MHz.

The oscilloscope 450 may be any suitable oscilloscope that can provide continued temporal data points related to the determined beat signal. The oscilloscope 450 may also have online capabilities. One exemplary oscilloscope 450, when not embodied directly in the circuitry 415, may be a PICOSCOPE 3000 model, which is available from Pico Technology of Tyler, Tex., USA.

The GUI 460 comprises any suitable display device, such as a laptop computer having its own processor and memory and being capable of operating using suitable software. Suitable software for use with the GUI 460 may be any software suitable for use with the oscilloscope 450.

The mixer 388 operates in conjunction with the processor 425 and the memory 435 to provide an output to the oscilloscope 450. The GUI 460 is coupled (for example, via USB) to the oscilloscope 450 and may also be coupled to the FMCW chirp generator 382.

Using system 400, an artificial increase in distance is made using the two FMCW signals from the FMCW chirp generator 382, both signals being located at a first location, and controlling the shift (delta time) between them. The FMCW1 is transmitted to an object located at a second location at a distance R from the first location. The delayed FMCW2 is transmitted to the object, and the received signal is mixed with a received signal from the non-delayed FMCW1 waveform. Doing so results in a higher beat frequency, which does not require a larger bandwidth.

The delta time is controlled by software, which may define a software stack, and which would allow for the optimization of a specific range. Because a speed of an analog-to-digital conversion of the signals defines the maximum frequency that can be processed, the maximum range that can be detected is also defined. Application needs will then define how much "delta" is required to satisfy both the accuracy and range of the system 400. This would also allow perturbations for improving accuracy further to more accurately determine sub-pixel frequency estimations. As stated above, the foregoing description is directed to the detection of closer objects at short ranges. Similar concepts can be applied for the detection of objects at longer ranges by, for example, starting the FMCW1 ahead of the FMCW2. In either case (FMCW2 starting before or after FMCW1), the system responds accordingly to detect the object as being either closer or farther away.

Figure 5A:
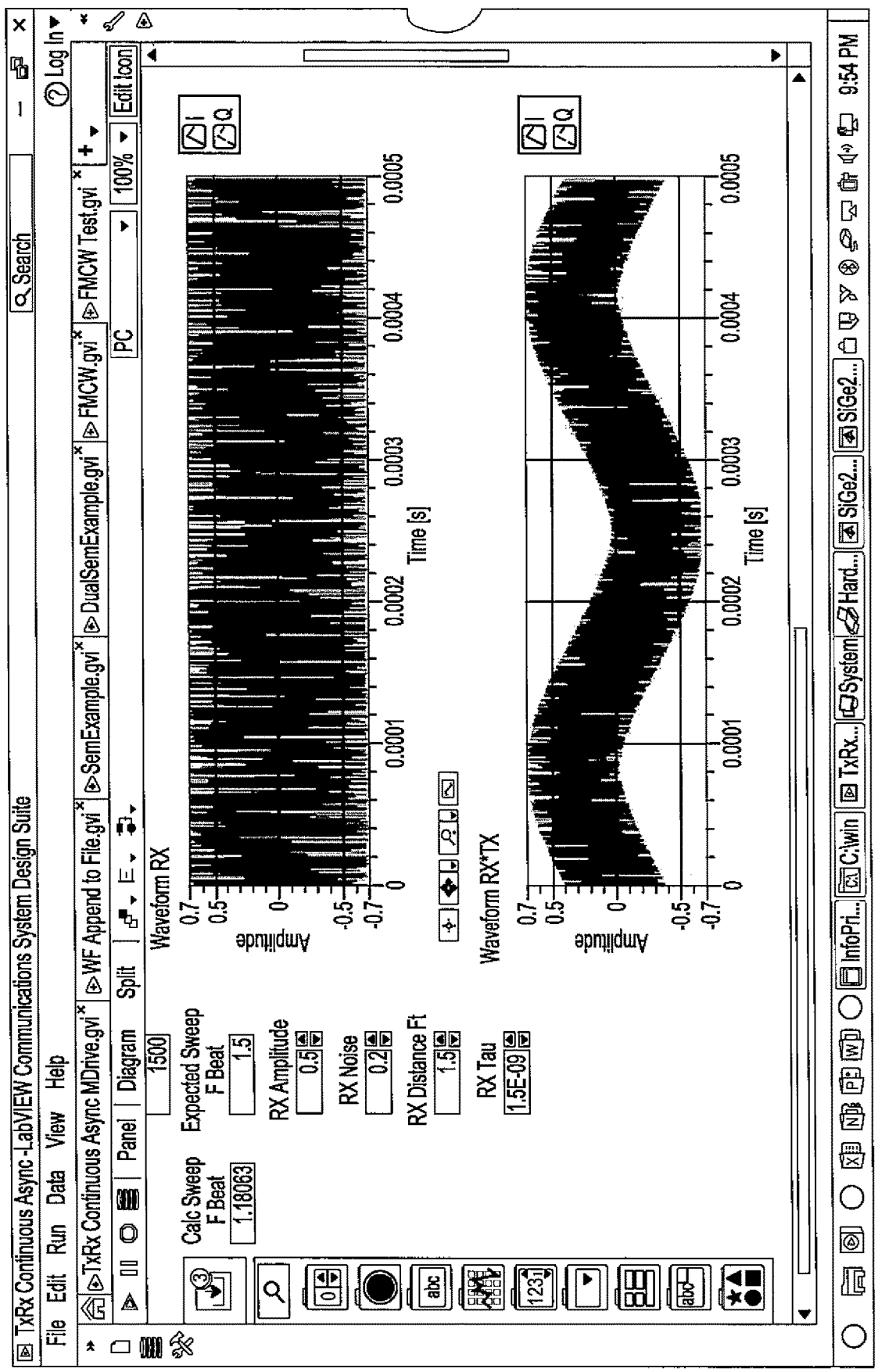
FIGS. 5A through 5F are computer screenshots of waveforms from the multiplication of the received signal and the transmitted signal, with regard to the system of FIG. 4, at various beat frequencies.
Figure 5B:
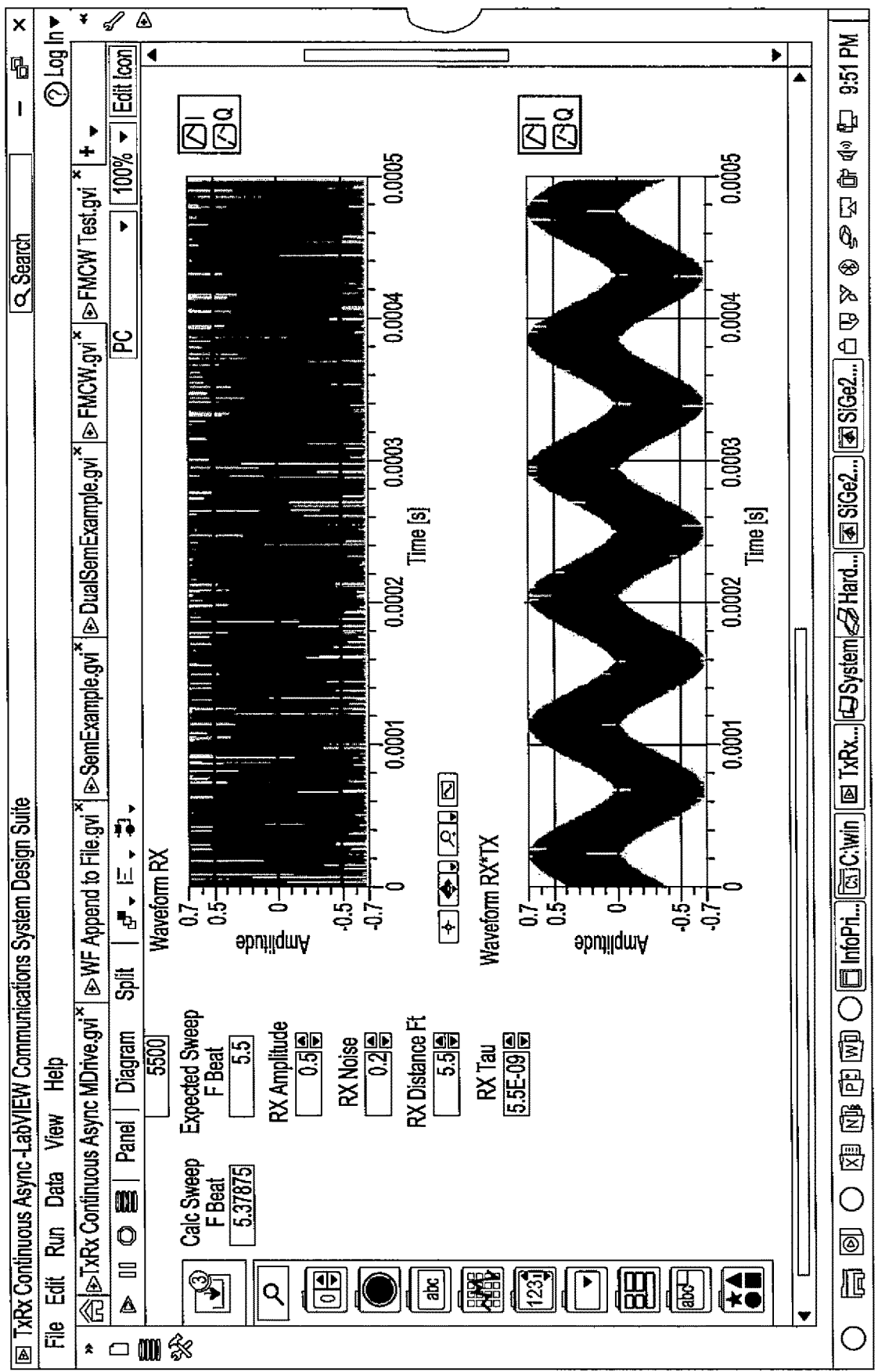
Figure 5C:
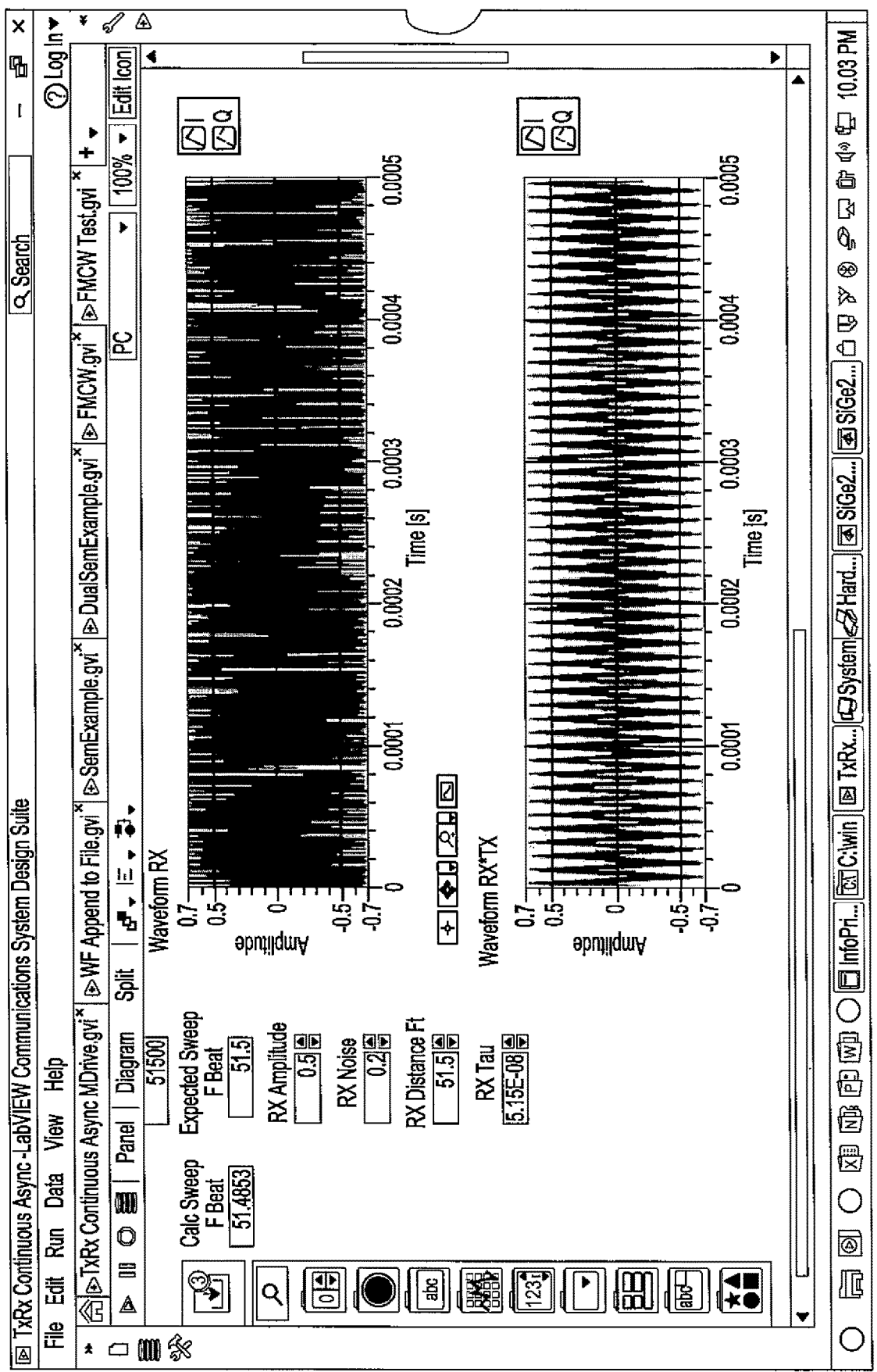
Figure 5D:
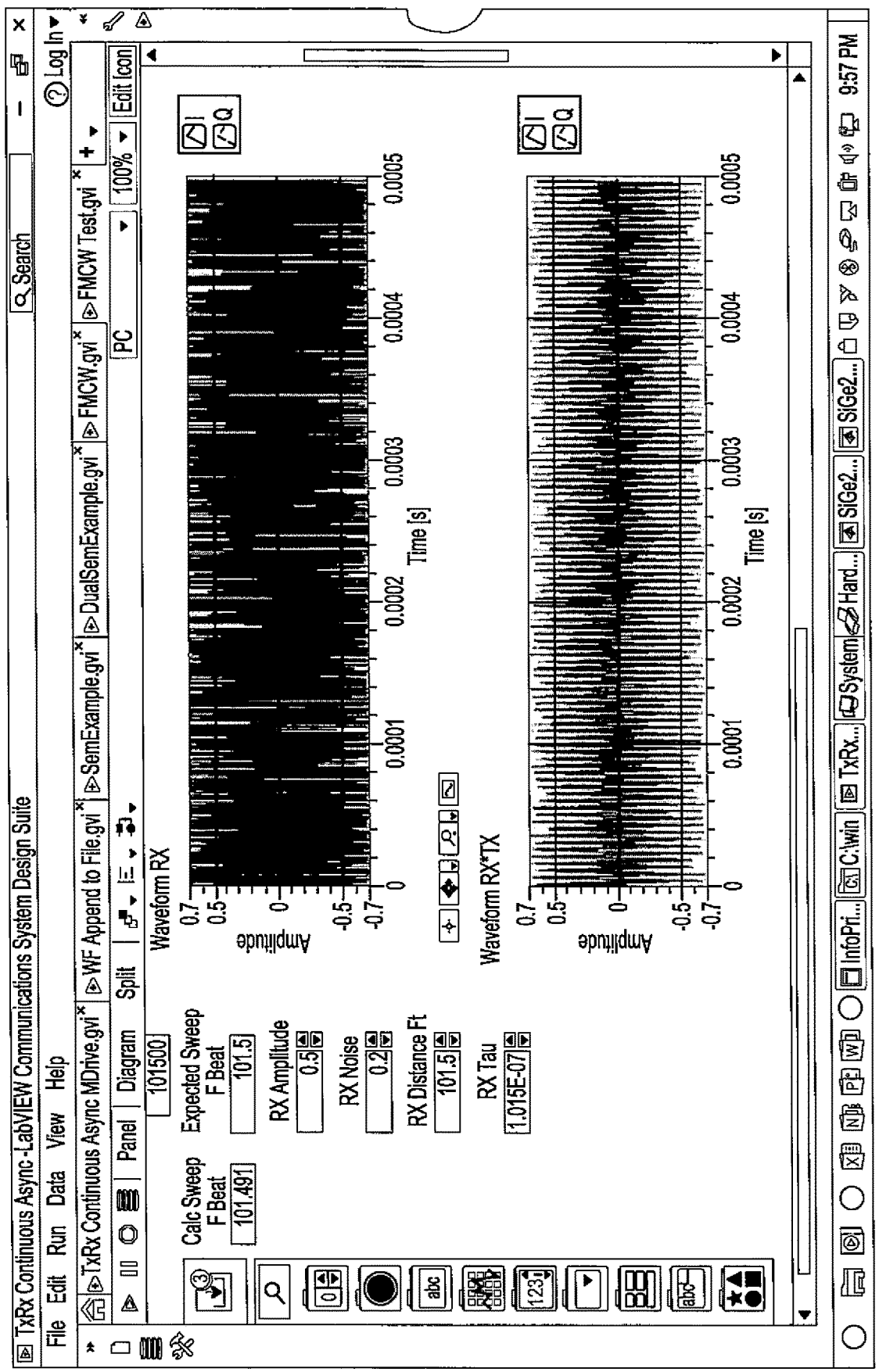
Figure 5E:
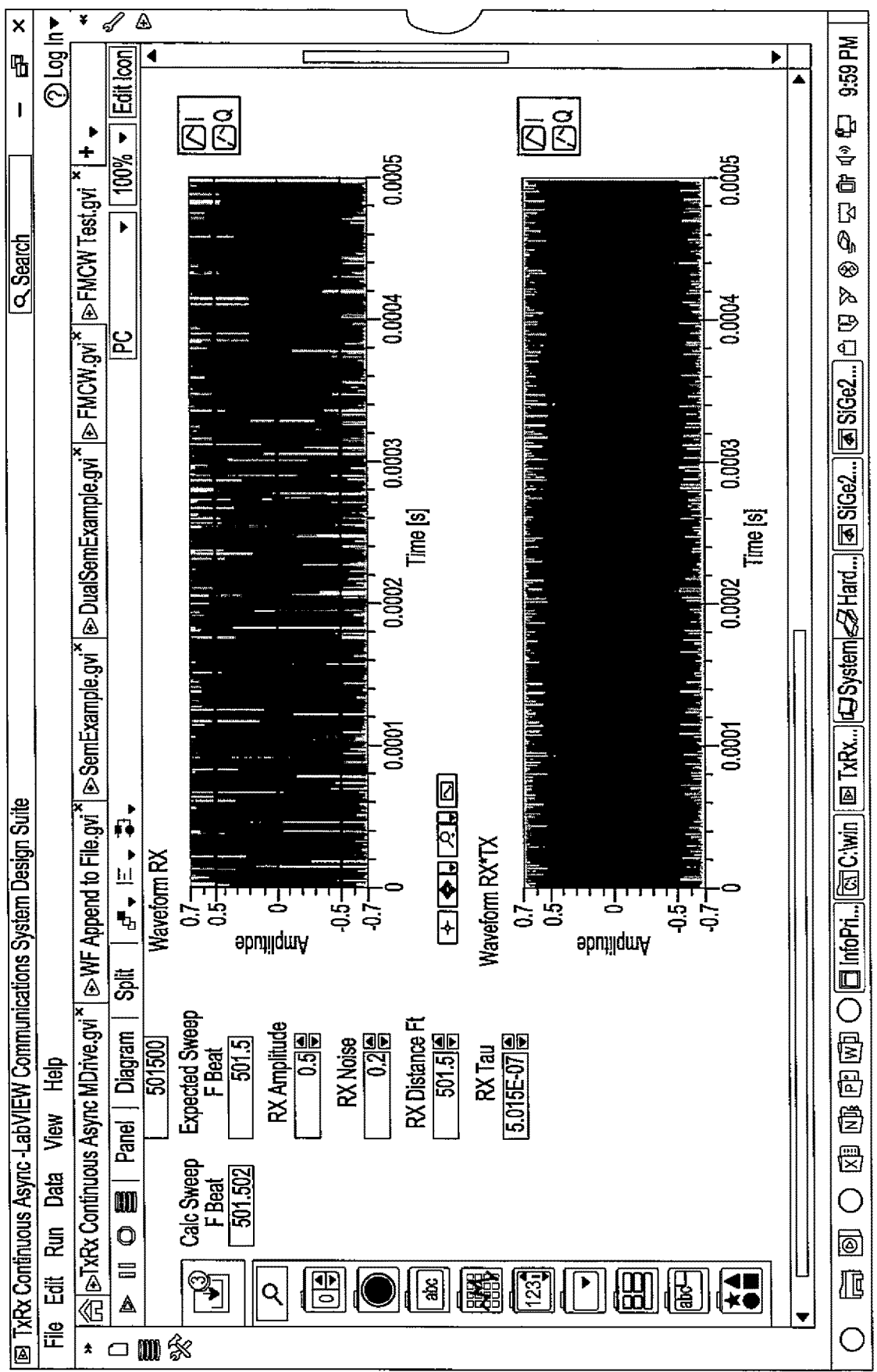
Figure 5F:
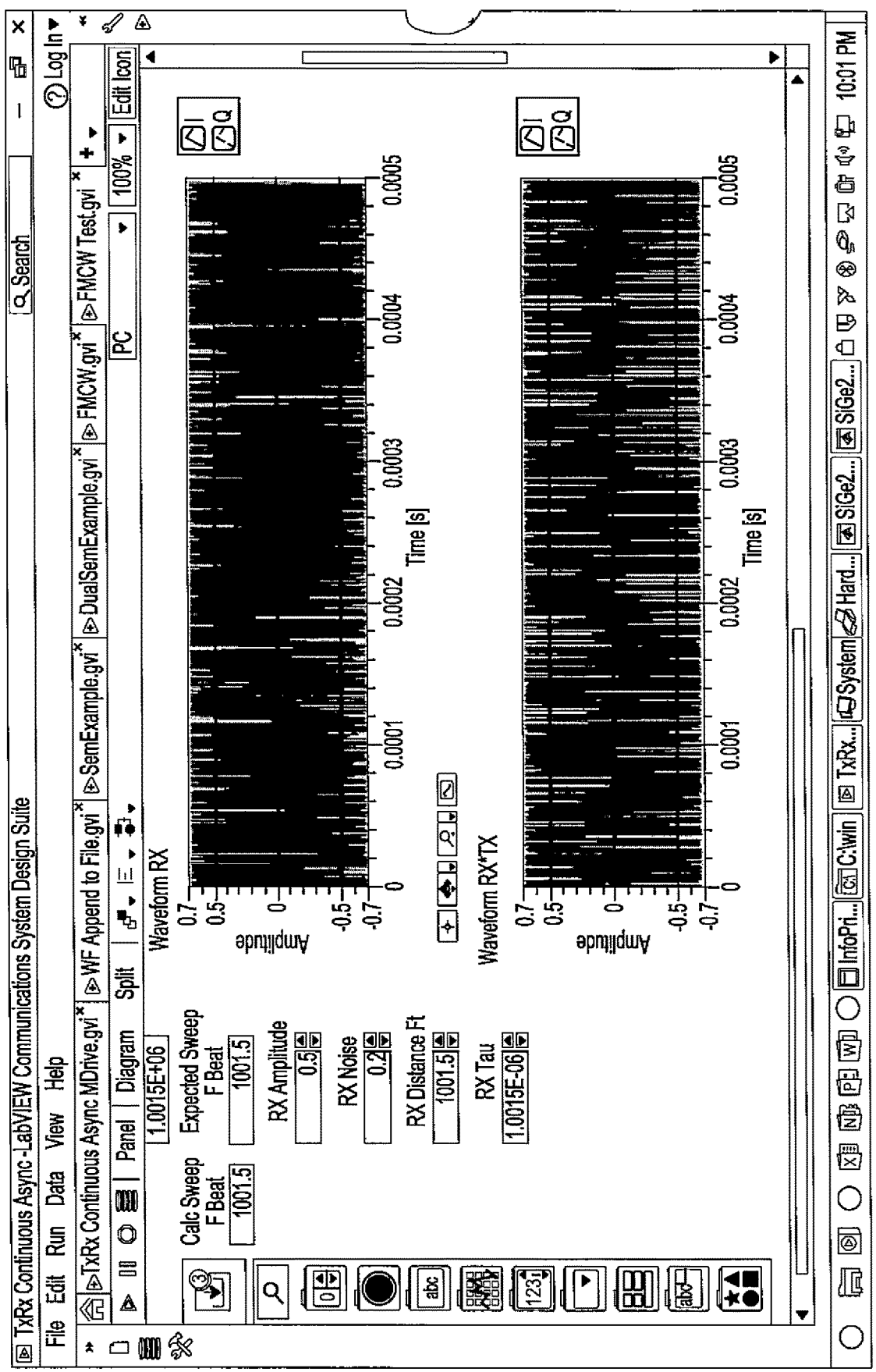

Referring now to FIGS. 5A through 5F, waveforms from the multiplication of the received signal (equation 320) and the transmitted signal (equation 310) are shown. As can be seen in FIG. 5A, a waveform 510 having a calculated sweep beat frequency of 1.18063 and an expected beat frequency of 1.5 shows an object detected at 1.5 feet; as can be seen in FIG. 5B, a waveform 520 having a calculated sweep beat frequency of 5.37875 and an expected beat frequency of 5.5 shows an object detected at 5.5 feet; as can be seen in FIG. 5C, a waveform 530 having a calculated sweep beat frequency of 51.4853 and an expected beat frequency of 51.5 shows an object detected at 51.5 feet; as can be seen in FIG. 5D, a waveform 540 having a calculated sweep beat frequency of 101.491 and an expected beat frequency of 101.5 shows an object detected at 101.5 feet; as can be seen in FIG. 5E, a waveform 550 having a calculated sweep beat frequency of 501.502 and an expected beat frequency of 501.5 shows an object detected at 501.5 feet; and as can be seen in FIG. 5F, a waveform 560 having a calculated sweep beat frequency of 1001.5 and an expected beat frequency of 1001.5 shows an object detected at 1001.5 feet.

In one example, a method comprises generating a first modulated continuous wave from a generating location; transmitting the first modulated continuous wave to an object positioned at a distance from the generating location; generating a second modulated continuous wave from the generating location, wherein the second modulated continuous wave is generated at a predetermined time different from a predetermined time at which the first modulated continuous wave is generated; receiving, at a mixer, the first modulated continuous wave from the object; receiving, at the mixer, the second modulated continuous wave from the generating location; mixing the received first modulated continuous wave with the second modulated continuous wave to produce a beat signal to determine a range of the object from the generating location; and outputting the determined range of the object from the generating location. The predetermined time at which the second modulated continuous wave is generated may be before or after the predetermined time at which the first modulated continuous wave is generated.

The second modulated continuous wave being generated at a predetermined time before the first modulated continuous wave is generated may be controlled by software. The method may further comprise defining the predetermined time before which the first modulated continuous wave is generated based on an estimation of the distance between the generating location and the object. Receiving the first modulated continuous wave from the object and receiving the second modulated continuous wave from the generating location may comprise receiving signals at frequencies of about 100 MHz to about 1100 MHz (although other frequency ranges may be used). Mixing the received first modulated continuous wave with the second modulated continuous wave to produce the beat signal may comprise multiplying the first modulated continuous wave and the second modulated continuous wave. The method may further comprise removing portions of the multiplied first modulated continuous wave and the second modulated continuous wave using a low pass filter. The beat signal may correspond to:

$$s_b(t) = \cos(2\pi f_b t + \phi_b),$$

wherein $f_b$ is a frequency beat of the beat signal and $\phi_b$ is a phase of the beat signal. The method may further comprise outputting the determined range of the object from the generating location to a display.

In another example, a computer system comprises one or more memories having computer readable code; one or more processors, where the one or more processors, in response to retrieving and executing the computer readable code, cause the computer system to perform the following: mixing a received first modulated continuous wave with a second modulated continuous wave to produce a beat signal to determine a range of an object from a generating location; and outputting the determined range of the object from the generating location.

Mixing the received first modulated continuous wave with the second modulated continuous wave to produce the beat signal may comprise multiplying the first modulated continuous wave and the second modulated continuous wave. The system may further comprise removing portions of the multiplied first modulated continuous wave and the second modulated continuous wave. The beat signal may correspond to:

$$s_b(t)=\cos(2\pi f_b t+\phi_b),$$

wherein $f_b$ is a frequency beat of the beat signal and $\phi_b$ is a phase of the beat signal. The system may further comprise outputting the determined range of the object from the generating location to a display.

In another example, a computer program product comprises a computer readable storage medium having program instructions embodied therewith, the program instructions executable by a computer system to cause the computer system to perform operations comprising mixing a received first modulated continuous wave with a second modulated continuous wave to produce a beat signal to determine a range of the object from a generating location; and outputting the range of the object from the generating location.

In the foregoing description, numerous specific details are set forth, such as particular structures, components, materials, dimensions, processing steps, and techniques, in order to provide a thorough understanding of the exemplary embodiments disclosed herein. However, it will be appreciated by one of ordinary skill of the art that the exemplary embodiments disclosed herein may be practiced without these specific details. Additionally, details of well-known structures or processing steps may have been omitted or may have not been described in order to avoid obscuring the presented embodiments.

The description of the present invention has been presented for purposes of illustration and description, but is not intended to be exhaustive or limiting in the form disclosed. Many modifications and variations will be apparent to those of ordinary skill in the art without departing from the scope of the invention. The embodiments were chosen and described in order to best explain the principles of the invention and the practical applications, and to enable others of ordinary skill in the art to understand the invention for various embodiments with various modifications as are suited to the particular uses contemplated.

What is claimed is:

1. A method, comprising:
   generating a first modulated continuous wave from a generating location;
   transmitting the first modulated continuous wave to an object positioned at a distance from the generating location;
   receiving the first modulated continuous wave from the object at the generating location;
   generating a second modulated continuous wave from the generating location, wherein the second modulated continuous wave is generated at a first predetermined time that is different from a second predetermined time at which the first modulated continuous wave is generated;
   generating a third modulated continuous wave from the generating location, wherein the third modulated continuous wave is generated at a third predetermined time that is different from the first predetermined time at which the second modulated continuous wave is generated and is different from the second predetermined time at which the first modulated continuous wave is generated;
   receiving, at a first mixer, a first portion of the received first modulated continuous wave wherein the first portion of the received first modulated continuous wave is mixed with a second modulated continuous wave to generate a first output;
   receiving, at a second mixer, a second portion of the received first modulated continuous wave wherein the second portion of the received first modulated continuous wave is mixed with the third modulated continuous wave to generate a second output;
   performing a first Fourier transformation on the first output to produce a first signal;
   performing a second Fourier transformation on the second output to produce a second signal;
   interleaving the first signal and the second signal and processing the interleaved signal to determine a range of the object from the generating location based on the spatial shift; and
   outputting the determined range of the object from the generating location.

2. The method of claim 1, wherein the second modulated continuous wave being generated at the first predetermined time different from the second predetermined time at which the first modulated continuous wave is generated is controlled by software.

3. The method of claim 1, further comprising defining the first predetermined time different from the second predetermined time at which the first modulated continuous wave is generated based on an estimation of the distance between the generating location and the object.

4. The method of claim 1, wherein receiving the first modulated continuous wave from the object and receiving the second modulated continuous wave at the first mixer comprises receiving signals at frequencies of about 100 MHz to about 1100 MHz.

5. The method of claim 1, wherein the first portion of the received first modulated continuous wave is mixed with the second modulated continuous wave by multiplying the first portion of the received first modulated continuous wave and the second modulated continuous wave.

6. The method of claim 5, further comprising removing portions of the multiplied first portion of the received first modulated continuous wave and the received second modulated continuous wave using a low pass filter.

7. The method of claim 6, wherein the beat signal corresponds to:

$$s_b(t)=\cos(2\pi f_b t+N_b),$$

wherein $f_b$ is the frequency beat of the beat signal and $N_b$ is a phase of the beat signal.

8. The method of claim 1, further comprising outputting the determined range of the object from the generating location to a display.

9. The method of claim 1, wherein receiving the first modulated continuous wave from the object and receiving the third modulated continuous wave at the second mixer comprises receiving signals at frequencies of about 100 MHz to about 1100 MHz.

10. A system comprising:
a chirp generator configured to generate a first modulated continuous wave and a second modulated continuous wave, wherein the second modulated continuous wave is generated at a first predetermined time that is different from a second predetermined time at which the first modulated continuous wave is generated, the chirp generator being further configured to generate a third modulated continuous wave, wherein the third modulated continuous wave is generated at a third predetermined time that is different from the first predetermined time at which the second modulated continuous wave is generated and is different from the second predetermined time at which the first modulated continuous wave is generated;
a transmit antenna configured to transmit the first modulated continuous wave to an object positioned at a distance from the generating location;
a receive antenna configured to receive the first modulated continuous wave from the object at the generating location;
a first mixer configured to mix a first portion of the received first modulated continuous wave with the second modulated continuous wave to generate a first output;
a second mixer configured to mix a second portion of the received first modulated continuous wave with the third modulated continuous wave to generate a second output; and
a computer system having,
one or more memories having computer readable code;
one or more processors, where the one or more processors, in response to retrieving and executing the computer readable code, cause the system to perform the following:
process the first output of the first mixer and the second output of the second mixer to mimic a spatial shift;
perform a first Fourier transformation on the first output to produce a first signal;
perform a second Fourier transformation on the second output to produce a second signal;
interleave the first signal and the second signal and process the interleaved signal to determine a range of the object from the generating location based on the spatial shift; and
output the determined range of the object from the generating location.

11. The system of claim 10, wherein the first portion of the received first modulated continuous wave is mixed with the second modulated continuous wave by multiplying the first portion of the received first modulated continuous wave and the second modulated continuous wave.

12. The system of claim 11, further comprising removing portions of the multiplied first portion of the received first modulated continuous wave and the second modulated continuous wave.

13. The system of claim 12, wherein the beat signal corresponds to:

$s_b(t)=\cos(2\pi f_b t+N_b)$, wherein $f_b$ is the frequency beat of the beat signal and $N_b$ is a phase of the beat signal.

14. The system of claim 10, further comprising outputting the determined range of the object from the generating location to a display.

* * * * *